United States Patent
Liberman et al.

(10) Patent No.: US 8,228,405 B2
(45) Date of Patent: Jul. 24, 2012

(54) REAL-TIME PIXEL SUBSTITUTION FOR THERMAL IMAGING SYSTEMS

(75) Inventors: Sergey Liberman, Bedford, MA (US); Francis M Feda, Sudbury, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 425 days.

(21) Appl. No.: 12/298,551

(22) PCT Filed: Jan. 16, 2008

(86) PCT No.: PCT/US2008/051133
§ 371 (c)(1),
(2), (4) Date: Oct. 27, 2008

(87) PCT Pub. No.: WO2008/089216
PCT Pub. Date: Jul. 24, 2008

(65) Prior Publication Data
US 2009/0092321 A1  Apr. 9, 2009

Related U.S. Application Data

(60) Provisional application No. 60/880,586, filed on Jan. 16, 2007.

(51) Int. Cl.
*H04N 9/64* (2006.01)
*H04N 5/217* (2011.01)

(52) U.S. Cl. .................. 348/246; 348/241
(58) Field of Classification Search ............ 348/241, 348/243, 245–247
See application file for complete search history.

(56) References Cited

U.S. PATENT DOCUMENTS

| | | | |
|---|---|---|---|
| 4,920,428 A * | 4/1990 | Lin et al. | 358/461 |
| 6,611,288 B1 * | 8/2003 | Fossum et al. | 348/246 |
| 6,693,668 B1 | 2/2004 | May et al. | |
| 6,741,754 B2 * | 5/2004 | Hamilton, Jr. | 382/275 |
| 7,034,874 B1 * | 4/2006 | Reinhart et al. | 348/246 |
| 7,616,237 B2 * | 11/2009 | Fridrich et al. | 348/241 |
| 2002/0105579 A1 * | 8/2002 | Levine et al. | 348/187 |
| 2002/0149684 A1 * | 10/2002 | Leveau-Mollier | 348/246 |
| 2003/0058998 A1 | 3/2003 | Aufrichtig et al. | |
| 2003/0146975 A1 * | 8/2003 | Joung et al. | 348/164 |
| 2003/0198400 A1 | 10/2003 | Alderson et al. | |
| 2004/0061785 A1 * | 4/2004 | Aufrichtig et al. | 348/207.99 |
| 2004/0239782 A1 | 12/2004 | Equitz et al. | |
| 2006/0022124 A1 | 2/2006 | Chuang | |

* cited by examiner

*Primary Examiner* — Kelly L Jerabek
(74) *Attorney, Agent, or Firm* — Maine Cernota & Rardin; Daniel J. Long; David A. Rardin

(57) ABSTRACT

A non-uniformity correction (NUC) process for imaging engines is augmented with real-time pixel substitution capability. This feature checks for pixels that have significantly degraded from their factory performance. Degraded pixels found are then substituted in real time. This process eliminates distractions to the camera system operator and prevents these degraded pixels from degrading the subjective image quality.

21 Claims, 3 Drawing Sheets

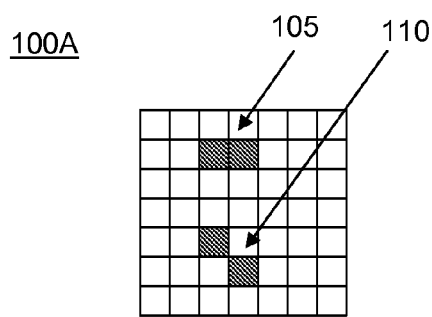
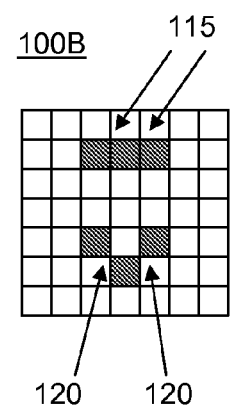
Figure 1A
Figure 1B
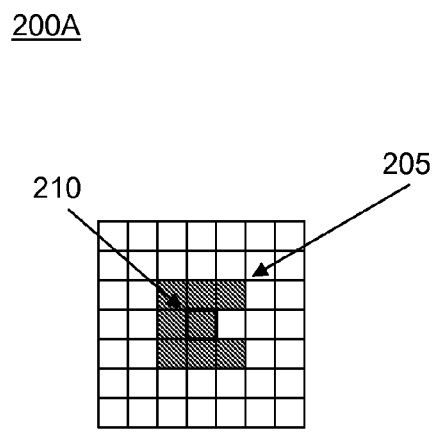
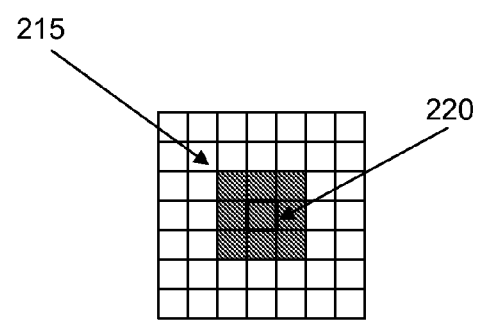
Figure 2A
Figure 2B

REAL-TIME PIXEL SUBSTITUTION FOR THERMAL IMAGING SYSTEMS

RELATED APPLICATIONS

This application claims the benefit of U.S. Provisional Application No. 60/880,586, filed Jan. 16, 2007. This application is herein incorporated in its entirety by reference.

FIELD OF THE INVENTION

The invention relates to imaging systems and, in embodiments, to pixel substitution in imaging and cooled and uncooled thermal imaging systems.

BACKGROUND OF THE INVENTION

Camera systems, including cooled and uncooled thermal imaging systems, developed to date are focal plane based with 20,000 to 300,000 pixels. A small portion of these pixels may degrade during the lifetime of the system, which is a significant deficiency to the subjective image quality and a distraction to the operators of the camera system. Often, these will result in a unit being returned for repair at significant cost to either the customer or the supplier.

What is needed, therefore, are techniques to overcome this disadvantage.

SUMMARY OF THE INVENTION

According to the present invention, the non-uniformity correction (NUC) process for imaging engines has been augmented with real-time pixel substitution capability. This feature checks for pixels that have significantly degraded from their factory performance. Degraded pixels found are first identified and then substituted in real time. The substitution is implemented by discarding the value read from the degraded pixel and substituting a value derived from good pixels in the vicinity of the degraded one. This process eliminates distractions to the camera system operator and prevents these degraded pixels from degrading the subjective image quality. The process of identifying a degraded pixel and substituting a new pixel value for the value read from it is referred to within as 'killing' a pixel. That is, to suppress the expression of a defective pixel by replacing its value with one derived from other, good pixels. Similarly, "bad pixel" or "good pixel" refers to the value attributed to a pixel identified as meeting criteria for a "bad" or "good" pixel, respectively. Additionally, pixel substitution refers to substituting the value read from a bad pixel with a value derived from neighboring good pixels.

Embodiments of the invention include a method for pixel substitution in an imaging system including an imaging engine, comprising the steps of generating indices of pixels marked for substitution in a first stage, generating indices of new pixels to be substituted from the indices of pixels marked for substitution in a second stage, and then updating a bad pixel map from the indices of new pixels to be substituted. Also, the method above where the first stage comprises fine offset correction during shutter operation. Furthermore, an embodiment is included where the second stage comprises checking outlier pixels against previously killed pixels.

Additionally, the imaging system above may include the second stage applying operability requirement features. Operability requirements define the allowable number and location of defective pixels in the focal plane. The focal plane may be partitioned into various regions, with different, independent operability requirements applied to each region. The operability requirement features can comprise multiple image areas. The multiple image areas may also be characterized by independent, externally modifiable attributes. Furthermore, the multiple image area attributes may comprise a value for the maximum number of killed pixels by a pixel class. These pixel classes may comprise single, pair, and cluster classes.

The previously mentioned operability requirement features may be applied based on global rules in another embodiment. The global rules may also be preset.

In additional embodiments, the operability requirement features control a pixel-kill algorithm and include at least one of: ignoring operability requirements, whereby all defective pixels identified are killed; applying operability requirements to set limits on a quantity and location of pixels to be killed; and disabling the pixel-kill algorithm such that no defective pixels are killed.

In yet another embodiment, a pixel-kill algorithm identifies and substitutes good pixels for bad pixels. The pixel-kill algorithm may operate on a lens cover image as a means to present a uniform image to the focal plane. Furthermore, modifications to the bad pixel map may be applied during subsequent fine offset correction. These modifications may also be reset at power up.

The imaging system may specifically be a thermal imaging system or an uncooled thermal imaging system.

Yet further embodiments include a system for pixel substitution comprising a first stage algorithm generating indices of pixels marked for substitution, where the pixels marked for substitution have a value; a second stage algorithm generating indices of new pixels to be substituted from the indices of the pixels marked for substitution; and a bad pixel map algorithm replacing the value of the pixels marked for substitution with a value derived from the values of neighboring good pixels, whereby a corrected image is produced. The bad pixel map algorithm may be based on count statistics.

Still another embodiment is an imaging device comprising an image processor configured to classify at least one bad pixel and groupings of pixels irrespective of location in a frame, update bad pixel count statistics on bad pixels for a region of the frame in which the one bad pixel is located, and substitute a bad pixel value with a value derived from values of neighboring good pixels based on count statistics.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1A is a schematic representation of an example of an image containing valid pixel pairs in accordance with one embodiment of the present invention.

FIG. 1B is a schematic representation of an example of an image containing no pixel pairs in accordance with one embodiment of the present invention.

FIGS. 2A and 2B are schematic representations of an example of an image containing clusters of bad pixels in accordance with one embodiment and described in Example 1.

DETAILED DESCRIPTION

Figure 3:
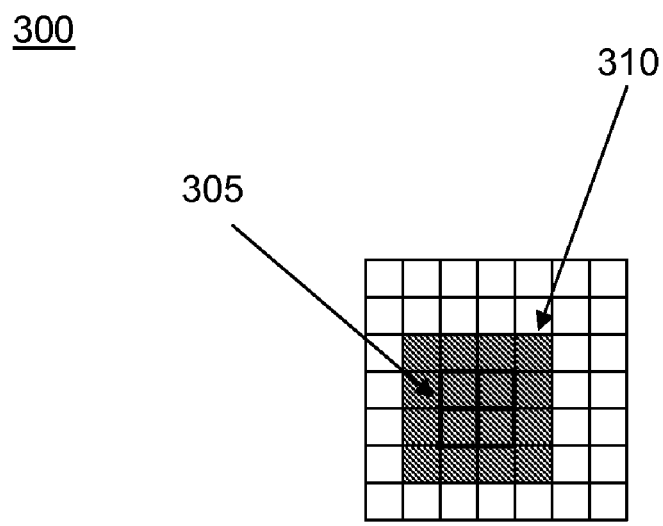
FIG. 3 is a schematic representation of an example of an image containing not pairs but individuals and multiple clusters of bad pixels in accordance with one embodiment and described in Example 2.

Over the lifespan of a thermal sensor, an increasing number of pixels stop operating. It is desirable to be able to identify such pixels in the field and kill them by modifying a bad pixel map. The bad pixel map, as used in embodiments, is the map in which information indicating which pixels are non-functional is stored. This map of known bad pixels is updated to contain new bad pixels that have been found. The map can permanently identify bad pixels that were originally discovered in production. The term 'kill' means that the value of a bad pixel is replaced with a value derived from the values of neighboring good pixels.

The algorithm to update values in the field is different from the calibration-based pixel kill algorithm. The field-based pixel kill algorithm is referred to as FPK and the calibration-based pixel kill algorithm as CPK. Differences are described below:

In illustrated embodiments, CPK operates on an image of a lens cover applying non-uniformity correction (NUC) and other downstream corrections. NUC is defined as a process whereby inherent pixel offset and gain variations across the focal plane are removed. This may, for example, be scene-based or shutter image-based. Basically, in NUC, an image is acquired by the focal plane to be processed to identify bad pixels. Effectively, it relies on the temperature difference between the lens cover and shutter to move the values of operating pixels from the offset value in NUC (non-responsive pixels will presumably always report the offset value after NUC).

FPK operates on the only uniform scene typically available to FPK, that of the shutter during the shutter operation (fine offset correction). By way of explanation, particular thermal imaging systems insert a shutter into the image path as a means to provide a uniform image, used for pixel calibration purposes. One means to identify defective pixels in a thermal imaging system is through a shutter calibration during a fine offset correction process. Periodically, a mechanical shutter is inserted into the optical path in front of the focal plane. This shutter is isothermal causing the pixels in the focal plane to 'see' a uniform scene. Pixel values read from the focal plane during this calibration should all be reasonably consistent since they are all viewing a uniform scene, namely the shutter. Small offset errors between pixels are corrected for during this process. Any individual pixels that output values that differ from the norm by more than a defined amount are considered defective pixels. These become candidate pixels to be killed. The FPK operation is as follows:

During the shutter operation (fine offset correction), acquire and average the fine offset map (shutter image). The term fine offset map is defined as a map used to store pixel offset values generated during the calibration process, which are subsequently applied to incoming video to help achieve pixel-to-pixel uniformity. Those skilled in the art will appreciate that he or she would not perform NUC or any other operations on the shutter image.

After that, the filtering algorithm described below would be applied as a background process. Two stages are described. The first stage of the algorithm looks for outliers in the fine offset map. The second stage of the algorithm checks outliers against previously killed pixels and against operability requirements of the thermal sensor. Operability requirements designate the requirements that define the acceptable number and location of bad focal plane pixels. As bad pixels are identified to be killed, they can be compared to some operability criteria to determine whether or not they should be killed. That is, a pixel to be killed must first meet the criteria for a bad pixel, but must also, optionally, meet operability requirements. These may put limits on the number of pixels that can be killed in particular regions of the image, or other limitations with respect to the proximity of pixels to be killed with respect to other previously killed pixels. Operability considerations are typically product-specific and not directly related to the method of finding defective pixels. The output of second stage will be modifications to the bad pixel map; these modifications can be applied to the map during the next fine offset correction, even as the new fine offset map is being acquired.

The bad pixel map shall be updated with the new pixels to be killed and written to random access memory (RAM). In embodiments, the modified bad pixel map should not be written to nonvolatile flash memory. The implication of this is that killed pixels will be restored at each power up and will have to be re-killed each time. There are at least three reasons for not saving updated kill maps to non-volatile flash memory. 1.) Should a pixel identified as bad become good in the future, it can then be used in the imagery rather than continue to be killed. 2.) If good pixels are erroneously identified as bad due to a corrupt image, they are not permanently identified as bad pixels to be killed. 3.) On power up, before the FPK algorithm is applied to the imagery, the user will see all of the bad pixels. This provides useful information on the true degradation of the image and an indication of whether continued use of the imaging system is acceptable or if servicing is required.

An upper limit may be established on the number of pixels to be killed during each shutter calibration. This is to avoid killing a large number of pixels during any one shutter calibration, on the expectation that there should not be a large number to kill at any one time.

There are three aspects to operability for the FPK algorithm: classification, statistics, and substitution. These are as follows. 1) Classification of bad pixels and groupings of pixels, irrespective of location in the frame. 2) Updating the bad pixel count statistics on bad pixels for the region of the frame (A1, A2, and A3) in which the pixel is located. 3) Decision to substitute a bad pixel with a new value which is generated based on the values of its neighbors, for example, with interpolated values from neighboring good pixels based on the count statistics.

Referring to FIGS. 1A and 1B, classification of bad pixels is accomplished according to the following rules for single pixels, pixel pairs, and pixel clusters. 1) Single Pixel: Any one bad pixel, if it is not adjacent to any other bad pixels, is considered a single bad pixel. 2) Pixel Pair: A pixel pair is defined as any two, and only two, adjacent bad pixels 105 and 110. 3) Pixel Cluster: A pixel cluster is defined as any pixel that is adjacent to no more than one good pixel. Note that the cluster designation is given to the pixel, and does not refer the entire group of bad pixels. The reason for defining a 'cluster' as a pixel adjacent to no more than one good pixel is that in this case interpolation is not possible. With two or more good pixels adjacent to a bad pixel, there is the opportunity to arrive at some intermediate value for the bad pixel to be killed based on those good pixels. In a 'cluster', there is a need to look beyond the immediately adjacent pixels for good pixels that can be used to help generate a value for the bad pixel.

Four examples of pixel configurations are given to define algorithm operations.

Example 1

Referring to FIGS. 2A and 2B, the center pixel 210, and center pixel 220 each is only classified as a cluster, since in each case it is adjacent to less than two good pixels. The remaining seven pixels 205, or eight pixels 215 (around the border) would only count against the total number of bad pixels.

Example 2

Referring to FIG. 3, the four pixels 305 in the center are each considered a bad cluster, since none of them is adjacent to at least two good pixels. Thus, the four pixels 305 in the center would add four to the total number of clusters found in this region of the image. The remaining pixels 310 (around the border) would count against the total number of bad pixels only. Other arrangements of bad pixels not meeting the rules identified above would be classified only as bad pixels, counted against the area in which they fall.

Example 3

Figure 4A:
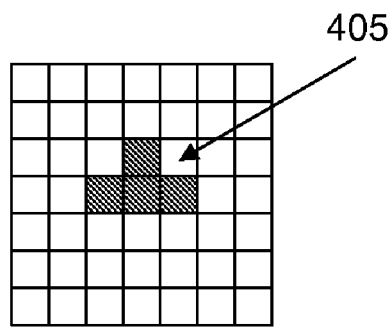
FIGS. 4A and 4B are schematic representations of an example of an image containing neither pairs nor clusters, but multiple individual bad pixels in accordance with one embodiment and described in Example 3.
Figure 4B:
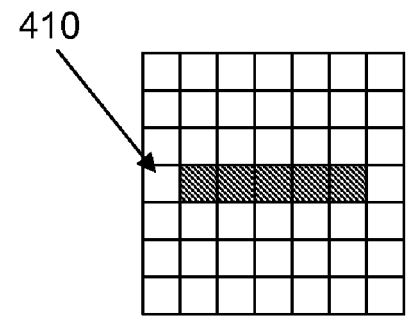

Referring to FIGS. 4A and 4B, these groupings of pixels are not considered pairs or clusters since they meet neither definition. In this case, the bad pixels count against the total number of bad pixels in the area. If an area boundary cuts through a grouping of pixels, then the bad pixel count statistics are updated based on the number of bad pixels that fall into each area.

Operability requirements can be defined by certain features and rules. The following nine features and rules are described next.

Figure 5:
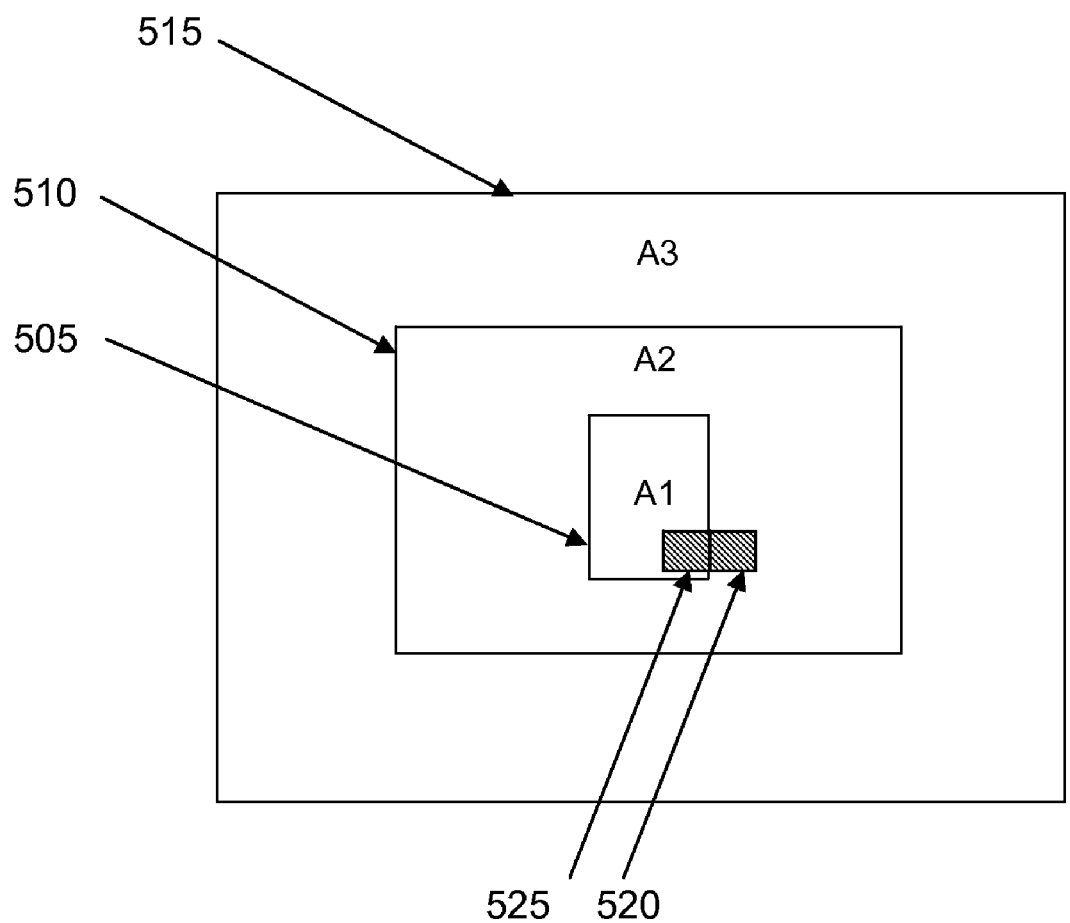
FIG. 5 is a schematic drawing illustrating the process of this invention and described in Example 4, configured in accordance with one embodiment of the present invention.

Feature 1. Referring to the embodiment of FIG. 5, there shall be a maximum of three image areas as shown in the following figure. Each region shall be treated independently. That is, area A1 shall not be considered to be included in A2. Neither shall A1 nor A2 be considered included in A3 in this embodiment. The number, size and location of the image areas A1, A2, and A3 should be considered exemplary only as well as the fact that they should be treated independently. The image can be partitioned in any arbitrary way (e.g. gridded regions). Statistics related to the number and location of bad pixels within each region are then developed and used to decide if a bad pixel in a given region should be killed or not. The purpose of defining regions is to permit the establishment of different requirements for the allowable number of killed pixels across the image. For example, in certain applications, one may want to allow fewer bad pixels in the center of the image than at the edges. This may not be the case in other imaging applications where each region is equally important to the next. In such case, a gridded arrangement of regions, and/or overlapping regions may be preferable. With respect to treating regions independently, this may be the case for specific embodiments, but does not have to be true in general. One could envision operability requirements that indicate no more than X killed pixels in any two adjacent regions, but no more than Y total killed pixels (where Y<2X) across the two regions.

Feature 2. Externally modifiable parameters for defining the bounding corners of areas A1 and A2 shall be provided in software. Area A3 is considered to encompass the entire focal plane area exclusive of areas A2 and A1.

Feature 3. Area Sizes: The allowable boundaries of A1 shall be less than or equal to A2, which shall in turn be less than or equal to A3. Setting two areas to the same boundary size effectively eliminates one of them. Thus, to realize an image with only one active area, set A1=A2=A3.

Feature 4. The software shall allow for operability requirements to be set independently for each region. This includes maximum allowable number of pixels which can be killed and any parameters that address clusters of pixels. The software shall also allow for operability requirements to be set across the total image without consideration of area boundaries and to keep track of the total number of bad pixels/pairs/clusters within the entire image.

Feature 5. Externally modifiable parameters shall be provided for defining operability requirements for each area independently.

Feature 6. Software input parameters shall allow for one of the following three rules to be selected for how operability requirements are to be applied. These rules are global in scope and apply across the entire focal plane without regard to area definitions. These rules provide some control to the user over how the FPK algorithm is to be applied. As explanatory background, 'All Pixels Killed' means that the FPK algorithm will kill everything it finds. A potential consideration with this is that the user has no idea how many bad pixels actually exist in the image since they are all being masked. This can be an issue if there is significant degradation in the focal plane. There are situations where objects of interest to the user might only be a few pixels in size. If that object happens to coincide with a group of bad pixels, it won't be seen by the user which can be problematic. 'Apply Operability Requirements' allows pixels to be killed up to some predefined limit. Beyond that, bad pixels are not suppressed. This helps to remove some number of 'annoyance' bad pixels that might be in the image, but if a large number of bad pixels occurs, these are not suppressed. This gives the user some visual indication of how degraded the focal plane is and whether servicing might be necessary. 'No Pixels Killed' shuts off the FPK algorithm. The user sees all bad pixels. This allows an assessment of focal plane degradation, but also provides a true indication of the actual image being acquired. Briefly stated below:

Feature 6, Rule a. All Pixels Killed: Any pixel that is identified as a candidate to be killed shall be suppressed without regard to operability requirements.

Feature 6, Rule b. Apply Operability Requirements: Operability requirements specific to each area A1-A3 shall be applied to a candidate pixel to determine whether it should or should not be killed.

Feature 6, Rule c. No Pixels Killed: In effect, this allows the algorithm to be disabled such that it never kills any pixels.

The selection of the rule to be used may be a factory setting, not available to the user. This configurability can provide maximum flexibility in the algorithm to allow its behavior to be tailored to the specific requirements of individual programs and customers.

Feature 7. For each area, the total number of pixel-pair kills is =PixelPairKill (variable). The killing of any candidate pixels that in combination with themselves and/or other already killed pixels would result in an operability violation (e.g. adjacent pixels) within the most critical area is not allowed. See above for definition of pixel pair.

Feature 8. For each area, the total number of cluster kills is =ClustKill (variable). See above for definition of pixel cluster. The rules should be stored in a camera definition file or as configurable parameters.

Feature 9. The identification of pixel pairs and clusters shall be considered independent of the definition of areas A1 505, A2 510, and A3 515 as described above. After identification, the pair or cluster shall be counted against the area with the highest priority that includes any part of the pair or cluster.

Example 4

There is a single pixel 520 to be killed in area A2 510, adjacent to the border of area A1 505. In this case, a single pixel kill would be recorded against area A2 510. Subsequently, another pixel is identified as a candidate for killing. This one is located adjacent to the one in A2 510, but on the other side of the border between the two regions. A pixel pair has now been created, with one pixel 525 in A1 and the other 520 in A2. This would be counted as a pixel pair against A1, and not as two individual pixels with one in each area. Also, the total number of individual dead pixels in A1 505 would be incremented by one. The total numbers of dead pixels, dead pixel pairs and dead pixel clusters in A2 510 would remain unchanged.

ALGORITHM DESCRIPTION. The input parameters used to control the First and Second Stage implementation embodiments are described below. Note that some of the second stage parameters are related to areas A1, A2, and A3 and should be considered exemplary. As discussed above, if other regions, or more or fewer regions are used, other parameters may be needed as necessary to describe the operability requirements associated with each region.

| | First Stage: |
|---|---|
| Inputs: | Averaged fine offset map (shutter image) - 16-bit data;<br>Sub-image size (side of subimage square, in pixels); default - 40;<br>Multiplicative factor for standard deviation; default - 15;<br>Fraction of pixels to be removed from calculating statistics; default - 8, which means that $\frac{1}{8}^{th}$ of subimage pixels will be removed from each end of the pixel value distribution in subimage; |
| Output: | Indices of all pixels marked for substitution. |
| | Second Stage: |
| Inputs: | Indices of all pixels marked for substitution;<br>Current bad pixel map;<br>M1 - max value of allowed kills in area 1 (most critical area);<br>M2 - max value of allowed kills in area 2;<br>M3 - max value of allowed kills in area 3 (least critical area);<br>X1, 2, 3; Y1, 2, 3 - upper left-hand corners of subimage areas;<br>W1, 2, 3; H1, 2, 3 - width and height of subimage areas;<br>PixelPairKill1 - total number of pixel-pair kills allowed in area 1<br>PixelPairKill2 - total number of pixel-pair kills allowed in area 2<br>PixelPairKill3 - total number of pixel-pair kills allowed in area 3<br>ClustKill1 - total number of cluster kills allowed in area 1<br>ClustKill2 - total number of cluster kills allowed in area 2<br>ClustKill3 - total number of cluster kills allowed in area 3<br>OperFlag - boolean flag for applying operability filter, where<br>True = operability requirements are to be applied<br>False = operability requirements are to be ignored<br>Tdelay - delay from power-up, seconds<br>MaxKill - max number of pixels killed at each iteration on the algorithm |
| Output: | Indices of new pixels that should be substituted in bad pixel map. |

The output of the second stage updates the bad pixel map using the existing KillPixel(i,j) subroutine. The KillPixel(i,j) subroutine searches the neighboring pixels of a 'bad' pixel to find a 'good' replacement. The newly identified dead pixels will be substituted in the bad pixel map and written to RAM. The map update process may be performed during the next fine offset correction, even as new fine offset data is being collected.

PSEUDOCODE LISTING 1. A First Stage implementation embodiment is shown below as a MATLAB code with comments:

```
function [rows,cols] = fieldpixkill (fodata, win,
stdfactor, tail)
% finds outliers (i.e. non-responsive pixels) in fine
offset map
% in fine offset map using field-based pixel kill algo;
%
% fodata - a frame of 16-bit pixel values;
% during a fine offset correction (an image of the
shutter);
% win - subimage size, win x win; default value 40
% stdfactor - multiplicative factor for std, default value
15;
% tail - denotes the number of min and max pixels to
ignore when
% calculating stats on subimage, e.g. tail=8 means ignore
⅛th of all
% subimage pixels on each end of their distribution;
default value 8;
% rows - vector of row indices of outlier pixels;
% cols - vector of column indices of outlier pixels.
% initialize rows and cols vectors
rows = zeros(0,0);
cols = zeros(0,0);
for i = 1:size(fodata,1)/win,
```

-continued

```
        for j = 1:size(fodata,2)/win,
            % extract subimage matrix
            subfmap = fodata(((i−1)*win+1):(i*win),((j−1)*win+1):(j*win));
            % convert subimage matrix to a vector, sort in ascending order
            sublin = sort(subfmap(:));
            % throw out ⅛th of pixels from each end of the sorted vector,
            % so as to get rid of influence of outliers on the mean and std
            lsub = length(sublin);
            if tail > 0,
                subsub = sublin(round(lsub/tail)+1:...
                    round(lsub*(tail−1)/tail));
            else
                subsub = sublin;
            end
            % calculate mean and std
            fmean = mean(subsub);
            fstd = std(subsub);
            % find indices of pixels whose values lie outside of
            % mean +/− factor * std
            [fr,fc] = find(abs(subfmap−fmean) > stdfactor*fstd);
            % convert indices to the global coordinates of the image and
            % append newly found indices to rows and cols vectors
            rows =[rows; (fr+(i−1)*win)];
            cols =[cols; (fc+(j−1)*win)];
        end
    end
```

PSEUDOCODE LISTING 2. A Second Stage implementation embodiment is shown below in pseudocode:
At power up, initialize the counts of dead pixels based on a count of the dead pixels identified in the Gain and Pixel Substitution map stored in flash memory. Subsequently, during operation, update as appropriate the N1, N2 and N3 counters associated with areas A1, A2 and A3 respectively based on any newly identified dead pixels that may occur.

```
IF time, elapsed from power-up, is less than Tdelay, don't update the map;
ELSE
    FOR each pair of indices from the first stage,
        // Don't update killed pixel statistics if any of the following conditions are met
        IF this pixel is already killed in bad pixel map, GOTO A;
        IF OperFlag == True AND operability would be violated by killing the pixel, GOTO A;
        IF (pix is in Area 1) AND N1 >= M1, GOTO A;
        IF (pix is in Area 2) AND N2 >= M2, GOTO A;
        IF (pix is in Area 3) AND N3 >= M3, GOTO A;
        // Otherwise, update the killed pixel statistics and jump out
        Substitute pixel in bad pixel map;
        IF (pix is in Area 1), N1 = N1 + 1, GOTO A;
        IF (pix is in Area 2), N2 = N2 + 1, GOTO A;
        IF (pix is in Area 3), N3 = N3 + 1, GOTO A;
        IF N1+N2+N3 = MaxKill, ENDFOR
        A
    END FOR
```

Updates to the bad pixel map in the dynamic memory can take place immediately. Updates to the map that is in the permanent memory can take place during the next fine offset correction. Note that areas 1, 2 and 3 may or may not overlap. To disable filtering operation on any area (or all three areas), set its size to (0,0).

Those skilled in the art will appreciate that pixel substitution can occur in real time on the camera system and be transparent to the end user of the product. This feature will boost the perceived and actual reliability of camera products. Real-time substitution will save product life cycle costs related to returned goods with the degraded pixels as root cause.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for pixel substitution in an imaging system including an imaging engine comprising the steps of:
    generating indices of pixels marked for substitution, in a first stage, during shutter operation;
    generating indices of new pixels to be substituted from said indices of pixels marked for substitution, in a second stage;
    updating a bad pixel map from said indices of new pixels to be substituted; and
    limiting said indices to a specified maximum number of said indices within a specified image area, wherein said specified maximum number and said specified image area are based on operability requirements wherein said method is conducted in substantially real-time.

2. The method of claim 1, wherein said second stage comprises checking outlier pixels against previously killed pixels.

3. The method of claim 1, wherein said second stage comprises applying operability requirement features.

4. The method of claim 3, wherein said operability requirement features comprise multiple image areas.

5. The method of claim 4, wherein said multiple image areas are characterized by independent, externally modifiable attributes.

6. The method of claim 5, wherein said multiple image area attributes comprise a value for maximum number of killed pixels by a pixel class.

7. The method of claim 6, wherein said pixel classes comprise single, pair, and cluster.

8. The method of claim 3, wherein said operability requirement features are applied based on global rules.

9. The method of claim 8, wherein said global rules are preset.

10. The method of claim 3, wherein said operability requirement features control a pixel-kill algorithm and include at least one of:
    ignoring operability requirements, whereby all defective pixels identified are killed;
    applying operability requirements to set limits on a quantity and location of pixels to be killed; and
    disabling said pixel-kill algorithm such that no defective pixels are killed.

11. The method of claim 1, wherein a pixel-kill algorithm identifies and substitutes good pixels for bad pixels.

12. The method of claim 11, wherein said pixel-kill algorithm operates on a lens cover image.

13. The method of claim 1, wherein modifications to said bad pixel map are applied during subsequent fine offset correction.

14. The method of claim 1, wherein modifications to said bad pixel map are reset at power up.

15. The method of claim 1 wherein said imaging system is a thermal imaging system.

16. The method of claim 1 wherein said imaging system is an uncooled thermal imaging system.

17. A system for pixel substitution comprising:
a display showing all pixels, prior to said pixel substitution, whereby an indication of system image degradation is provided to a user;
a first stage algorithm generating in real-time indices of pixels marked for substitution, said pixels marked for substitution having a bad value and limiting said indices of pixels to a specified maximum number of said indices of pixels within a specified image area, wherein said specified maximum number and said specified image area are based on operability requirements;
a second stage algorithm generating in real-time indices of new pixels to be substituted from said indices of pixels marked for substitution; and
a bad pixel map algorithm replacing said value of said pixels marked for substitution with a value derived from values of neighboring good pixels, whereby a corrected image is produced.

18. The system of claim 17, wherein said bad pixel map algorithm is based on count statistics.

19. The system of claim 17, wherein said generating indices of pixels marked for substitution occurs during shutter operation.

20. An imaging device comprising an image processor configured to:
display all pixels, prior to processing with said image processor, whereby an indication of device image degradation is provided to a user;
classify at least one bad pixel and groupings of pixels, irrespective of location in a frame;
update bad pixel count statistics on bad pixels for a region of said frame in which said at least one bad pixel is located;
limit bad pixels to a specified maximum number of bad pixels within a specified image area, wherein said specified maximum number and said specified image area are based on operability requirements; and
substitute in real-time a bad pixel value with a value derived from values of neighboring good pixels based on count statistics.

21. The device of claim 20, wherein said classification occurs during shutter operation.

* * * * *